(12) United States Patent
Loetter

(10) Patent No.: US 9,210,563 B2
(45) Date of Patent: Dec. 8, 2015

(54) CONTEXT BASED CACHING OF CLOUD DATA

(71) Applicant: Nextivity, Inc., San Diego, CA (US)

(72) Inventor: Michiel Petrus Loetter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 186 days.

(21) Appl. No.: 13/860,128

(22) Filed: Apr. 10, 2013

(65) Prior Publication Data

US 2014/0032645 A1    Jan. 30, 2014

Related U.S. Application Data

(60) Provisional application No. 61/623,030, filed on Apr. 11, 2012.

(51) Int. Cl.
| | |
|---|---|
| *H04W 8/12* | (2009.01) |
| *H04L 29/08* | (2006.01) |
| *G06F 9/00* | (2006.01) |
| *G06F 17/30* | (2006.01) |
| *H04W 4/18* | (2009.01) |
| *H04W 4/02* | (2009.01) |

(52) U.S. Cl.
CPC . *H04W 8/12* (2013.01); *G06F 9/00* (2013.01); *G06F 17/30* (2013.01); *H04L 67/2847* (2013.01); *H04L 67/2852* (2013.01); *H04W 4/18* (2013.01); *H04L 67/10* (2013.01); *H04L 67/22* (2013.01); *H04W 4/02* (2013.01)

(58) Field of Classification Search
CPC .......................... H04L 67/2847; H04L 67/22
USPC .................................................. 709/224, 231
See application file for complete search history.

(56) References Cited

U.S. PATENT DOCUMENTS

| | | | |
|---|---|---|---|
| 6,195,622 B1 * | 2/2001 | Altschuler et al. ................ 703/2 |
| RE44,606 E * | 11/2013 | Herz et al. .................... 455/445 |
| 8,805,950 B1 * | 8/2014 | Landsman et al. ............ 709/213 |
| 2007/0061229 A1 * | 3/2007 | Ramer et al. .................... 705/35 |
| 2008/0071988 A1 * | 3/2008 | Schloter et al. ............... 711/118 |
| 2011/0306304 A1 * | 12/2011 | Forutanpour et al. ....... 455/67.11 |
| 2012/0220308 A1 * | 8/2012 | Ledlie ......................... 455/456.1 |
| 2013/0079033 A1 * | 3/2013 | Gupta et al. ............... 455/456.2 |

* cited by examiner

*Primary Examiner* — Karen Tang
(74) *Attorney, Agent, or Firm* — Mintz Levin Cohn Ferris Glovsky and Popeo, P.C.

(57) ABSTRACT

A request from a mobile device for information is received at a local coverage device. The local coverage device includes at least one computing system having at least one data processor. Whether the information has been locally stored on the local coverage device is determined using the local coverage device and the received request. The storage being based on a determined likelihood the mobile device would request access to the information. The likelihood being determined based at least on a context of the mobile device. The requested information is provided using the local coverage device. Related apparatus, systems, techniques, and articles are also described.

13 Claims, 3 Drawing Sheets

CONTEXT BASED CACHING OF CLOUD DATA

RELATED APPLICATIONS

This application claims priority to U.S. Provisional Patent Application No. 61/623,030, filed Apr. 11, 2012, the content of which is hereby incorporated by reference in its entirety.

TECHNICAL FIELD

The subject matter described herein relates to caching of data based on context. Particularly, the subject matter described herein relates to context caching of data relating to cloud based services.

BACKGROUND

Cloud computing is the delivery of computing as a service rather than a product, whereby shared resources, software, and information are provided to computers and other devices over a network (e.g. the Internet). Cloud computing entrusts services with a user's data, software and computation. End users may access cloud based applications through a web browser or a light weight desktop or mobile app while the business software and data are stored on servers at a remote location.

Many cloud based computing services are offered today (e.g. Microsoft SkyDrive). The use of cloud based computing has also spread to the mobile industry with operating systems such as iOS from Apple, Android by Google and Windows Phone by Microsoft. Each operating system offers access to cloud based computing resources and cloud based storage of user content. For example, an Amazon kindle device allows users to store books, videos, music, and magazine subscriptions in the cloud.

Cloud based systems have many advantages including the ability to provide vast amounts of storage to end users at a fraction of the cost of local storage, lower cost access to applications such as word processing, spreadsheet or even more complex applications.

However, in a mobile context, cloud based solutions also have disadvantages. One disadvantage is the latency in accessing information. For example, when content is selected for use, it takes a finite amount of time for the content to be downloaded to the device before the user may access the content (for example, downloading a song). To overcome this delay, solutions that rely on partial downloading of information to the mobile device have been proposed. For example, the beginning of the content may be stored locally (thereby saving storage space) and the rest of the content may be downloaded while the beginning of the content may be accessed. As the amount of content a subscriber has grows and as more data intensive content (e.g. video) becomes a greater fraction of the content accessed, this solution cannot adequately address the reduction in mobile cloud user experience.

SUMMARY

In one aspect, a request from a mobile device for information is received at a local coverage device. The local coverage device includes at least one computing system having at least one data processor. Whether the information has been locally stored on the local coverage device is determined using the local coverage device and the received request. The storage being based on a determined likelihood the mobile device would request access to the information. The likelihood being determined based at least on a context of the mobile device. The requested information is provided using the local coverage device.

In another aspect, data is received characterizing a request for information from a mobile device to a local coverage device. Whether the information has been locally stored on the local coverage device is determining using the received data. The storage being based on a determined likelihood the mobile device would request access to the information. The likelihood being determined based at least on a context of the mobile device. The requested information is provided.

In yet another aspect, a presence of a mobile device entering a coverage area of a local coverage device is detected using the local coverage device. Data from at least one cloud service is requested using the local coverage device. The data being determined based at least on a context of the mobile device. The context includes at least one of the group consisting of: a geographic location of the local coverage device, a temporal location of the local coverage device, and previous requests by the mobile device for data. The requested data is received at the local coverage device. The requested data is stored at the local coverage device for later use by the mobile device.

One or more of the following features can be included. For example, the context of the mobile device can include a geographic location of the mobile device or a temporal location of the mobile device. The context of the mobile device can include a characterization of previous requests by the mobile device for information. The information can originate from one or more cloud services. The local coverage device can be wirelessly connected to the mobile device and connected to one or more cloud services via a network. The local coverage device can comprise one or more of: smart repeaters, cellular Femto cells, or wireless routers. The local coverage device can provide network access for mobile devices with a local coverage area. Providing the requested information can include transmitting the requested information.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, latency to access cloud data is substantially reduced leading to a vastly improved user experience.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
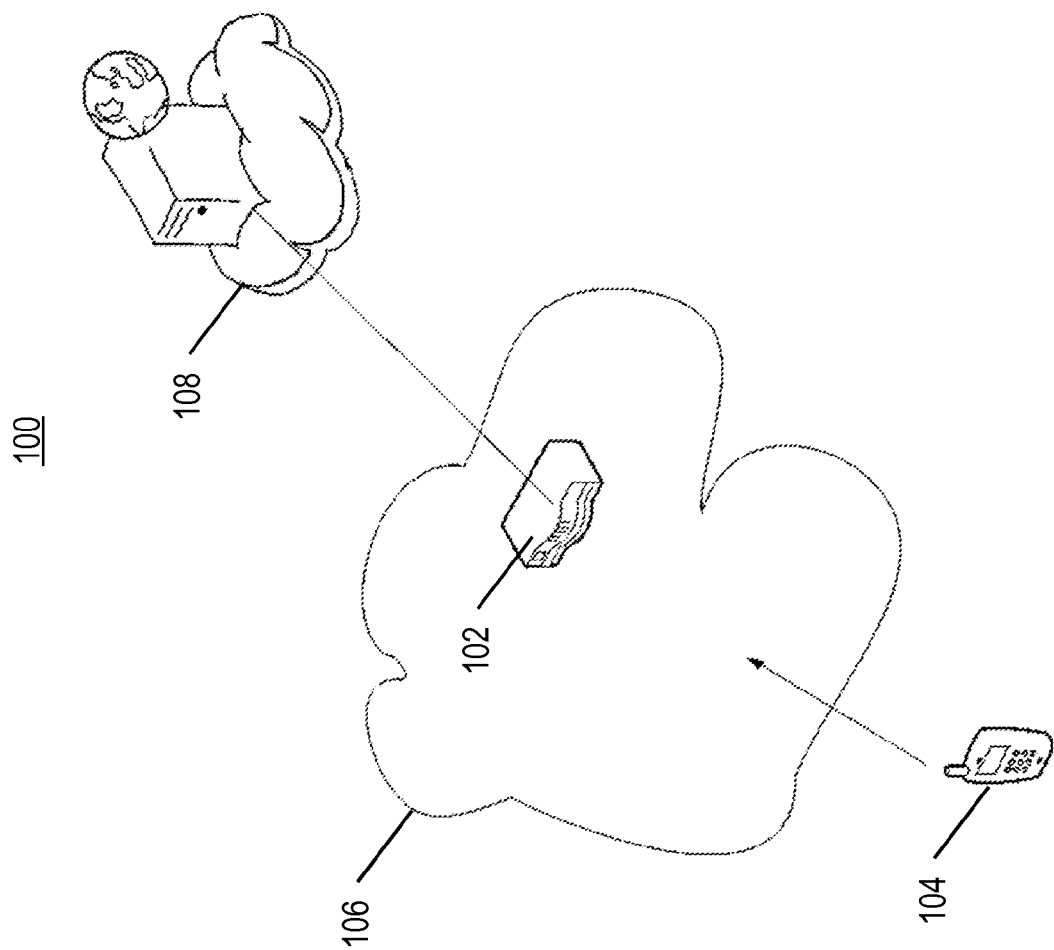
FIG. 1 is a schematic illustrating a method and system for intelligent local caching of relevant mobile device user information and data.

The current subject matter addresses intelligent local caching of relevant user information and data. FIG. 1 is a schematic 100 illustrating intelligent local caching or storage of information. A local coverage device 102 provides network access for mobile devices 104 within a local coverage area 106. The local coverage device 102 is connected to the cloud 108 via a network. The local coverage device 102 can, for example, be a Wi-Fi router, a cellular Femto cell or a smart repeater. A mobile device 104 enters the local coverage area 106 of the local coverage device and the local coverage device 102 can detect its presence in the local coverage area 106. The local coverage device 102 can send a notification that the mobile device 104 is in its local coverage area 106 to one or more cloud services residing in the cloud 108. The mobile device 104 can be subscribed to the cloud services. A determination is made, based on context of the mobile device 104 or local coverage device 102 (e.g. geographic and/or temporal location, the usage profile of the mobile device 104, past requests for information or data, etc.), as to what information or data the mobile device 104 would most likely request access to. This information or data is then sent to the local coverage device 102 where it is locally stored or cached using an appropriate caching algorithm (e.g., Bélády's optimal algorithm or the clairvoyant algorithm, Pseudo-Least/Most Recently Used, etc.).

Figure 2:
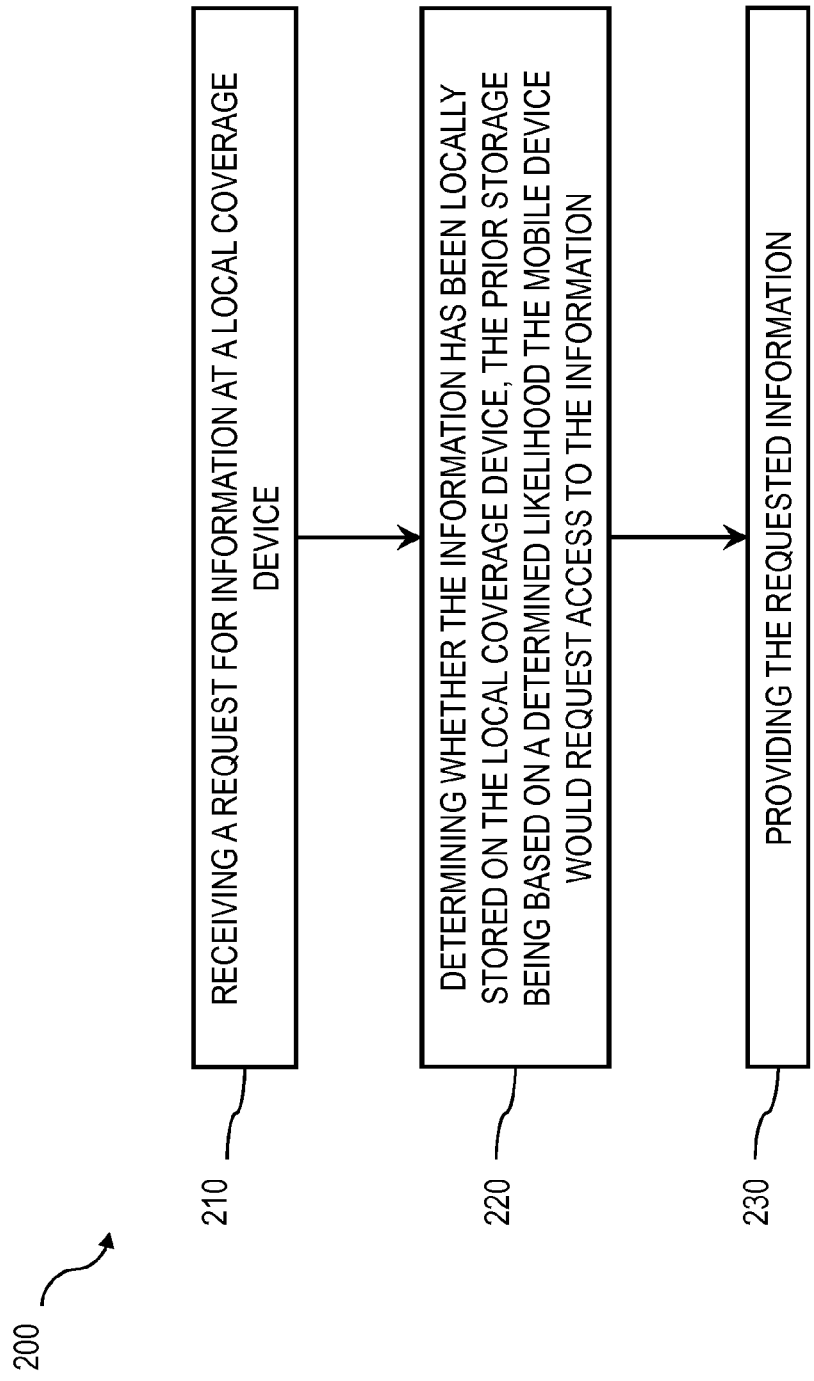
FIG. 2 is a process flow diagram illustrating a method of providing previously stored data to a mobile device.

FIG. 2 is a process flow diagram 200 illustrating a method of providing previously stored data to a mobile device 104. A local coverage device 102 receives at 210 a request for information from a mobile device 104. Using the received request, at 220, the local coverage device 102 determines whether the information has previously been locally stored on the local coverage device 102. The storage of information is based on a determined likelihood the mobile device 104 would request access to the information. The likelihood is determined based at least on a context of the mobile device 104. The context can include geographic and/or temporal location, the usage profile of the mobile device 104, and past requests for information or data. The requested information can originate from one or more cloud services. The local coverage device 102 provides the requested information at 230. The providing can include transmitting the requested information.

Figure 3:
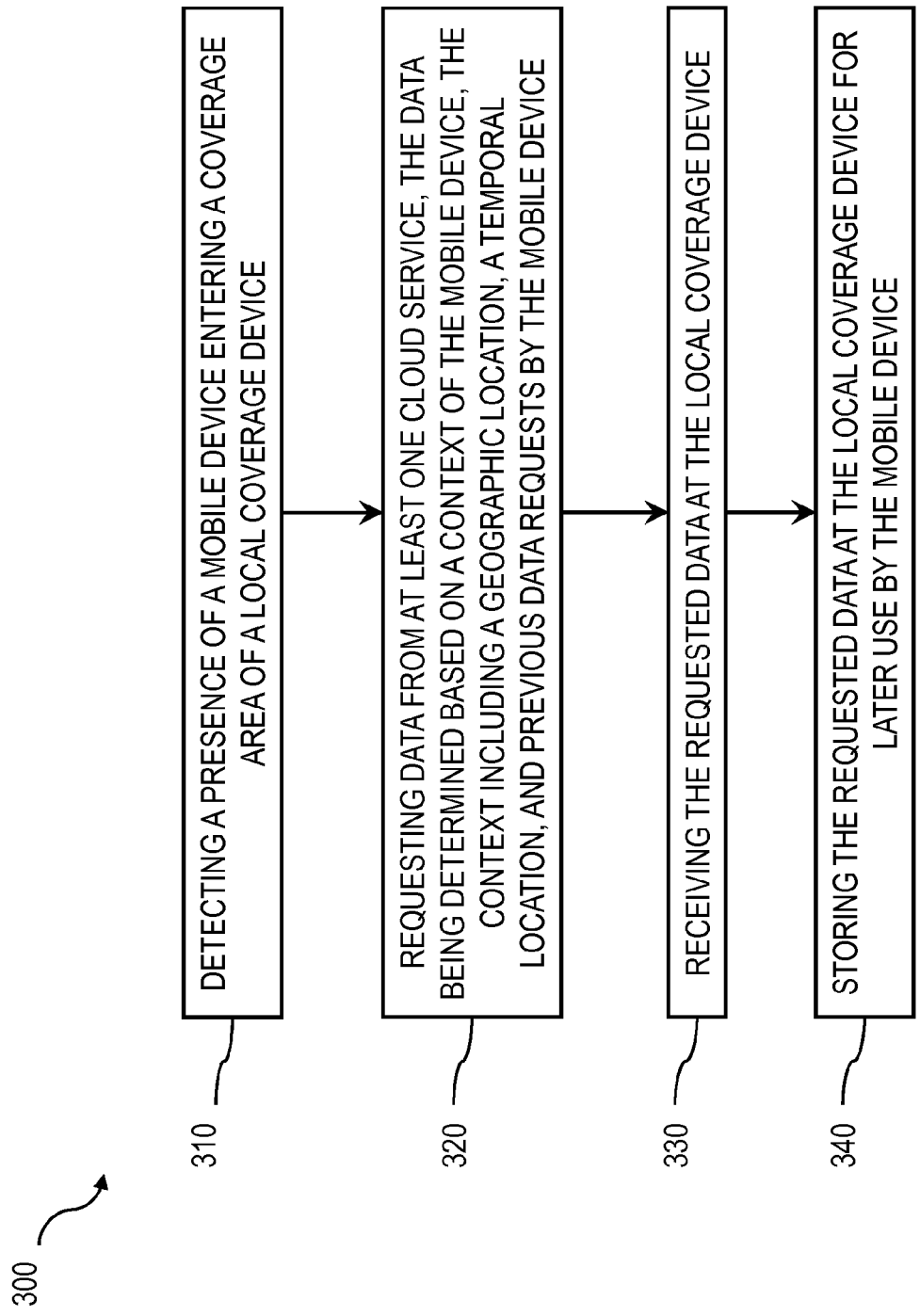
FIG. 3 is a process flow diagram illustrating a method of storing or caching data at a local coverage device.

FIG. 3 is a process flow diagram 300 illustrating a method of storing or caching data at a local coverage device 102. A local coverage device detects, at 310, a presence of a mobile device 104 entering a coverage area 106 of the local coverage device 102. The local coverage device 102 requests, at 320, data from at least one cloud service. The data is determined based at least on a context of the mobile device 104. The context can include a geographic and/or temporal location of the local coverage device 102 or of the mobile device 104. The context can include previous requests by the mobile device 104 for data. The local coverage device receives, at 330, the requested data. The requested data is stored at the local coverage device for later use by the mobile device 102.

When the mobile device 104 requests access any specific piece of data (i.e. content or information), there is a high likelihood that the data can be retrieved from the local cache stored in the local coverage device 102. As the data is locally stored, the latency to access this data is substantially reduced leading to a vastly improved user experience. When the requested data has not been cached (e.g. it is unlikely, given the context, that the mobile device 104 would have requested that information), the requested data can be retrieved from the relevant cloud service. At this point, the local cache or storage can be updated to improve the user access experience as well as future user accesses to the same data.

Context (and therefore the basis of the determination as to what data to cache locally) may comprise a geographic location of the local coverage device 102. For example, the local coverage device 102 may be located at the home of the owner of the mobile device 104. When the owner comes home, based on previous experiences (e.g. historical data), the user typically requests access to newspaper subscriptions. Based on this context, the local coverage device 102 will cache all newspapers to which the mobile device 104 subscribes. The context may also comprise a temporal location. In the above-mentioned example, the owner of the mobile device may access video in the morning (e.g. prior to leaving for work), and may access newspaper articles in the afternoon (e.g. after returning from work). The local coverage device 102 may cache the appropriate content based on the temporal location.

As another example, the local coverage device 102 may be located in a classroom in a school where specific educational material and textbooks needs to be made available to a number of mobile devices 104 in the local coverage area 106 of the local coverage device 102. This information can be cached locally on the local coverage device 102 and as students enter the coverage area 106, this information may be made locally available for quick access using their mobile devices 104.

The determining of which data or information to cache at the local coverage device 102 can occur at the local coverage device 102, the mobile device 104, the cloud services 108, or another server. The determination can be made using, for example, an inference engine, statistical based engine, and/or rules set, each using predetermined rules. For example, an inference engine is a computer program that tries to derive answers from a knowledge base. The knowledge base can include not only the mobile device context, but also other information and rules. The inference engine processes the information in the knowledge base for the ultimate purpose of formulating new conclusions (such as what data or information might relevant to a particular user or mobile device).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
   receiving, at a first local coverage device of a plurality of local coverage devices and from a mobile device, a request for information, the first local coverage device including at least one computing system having at least one data processor, the first local coverage device including a smart repeater device providing wireless network access for the mobile device;
   determining, using the first local coverage device and the received request, whether the information has been locally stored on the first local coverage device and prior to receiving the request, the prior storage being based on a determined likelihood the mobile device would request access to the information while accessing the network via the first local coverage device, the likelihood being determined based at least on a context of the mobile device;
   transmitting, from the first local coverage device to one or more cloud services, a notification that the mobile device is within a coverage area of the first local coverage device; and
   providing, using the first local coverage device and when the information is stored on the first local coverage device, the requested information directly from the first local coverage device, wherein the information is provided from a source other than the first local coverage device when the mobile device is not within the coverage area of the first local coverage device.

2. The method of claim 1, wherein the context of the mobile device includes a geographic location of the mobile device or a temporal location of the mobile device.

3. The method of claim 1, wherein the context of the mobile device includes a characterization of previous requests by the mobile device for information.

4. The method of claim 1, wherein the information originates from the one or more cloud services prior to storage on the first local coverage device.

5. The method of claim 1, wherein the first local coverage device is wirelessly connected to the mobile device and connected to one or more cloud services via a network.

6. The method of claim 1, wherein the first local coverage device provides network access for a plurality of additional mobile devices with the local coverage area.

7. The method of claim 1, wherein providing the requested information includes transmitting the requested information.

8. A non-transitory computer program product storing instructions, which when executed by at least one data processor of at least one computing system, perform operations comprising:
   receiving data characterizing a request for information from a mobile device to a first local coverage device of a plurality of local coverage devices, the first local coverage device including a smart repeater device providing wireless network access for the mobile device;
   determining, using received data, whether the information has been locally stored on the first local coverage device and prior to receiving the request, the prior storage being based on a determined likelihood the mobile device would request access to the information while accessing the network via the first local coverage device, the likelihood being determined based at least on a context of the mobile device;
   transmitting, from the first local coverage device to one or more cloud services, a notification that the mobile device is within a coverage area of the first local coverage device; and
   providing, when the information is stored on the first local coverage device, the requested information directly from the first local coverage device, wherein the information is provided from a source other than the first local coverage device when the mobile device is not within the coverage area of the first local coverage device.

9. The method of claim 8, wherein the context of the mobile device includes a geographic location of the mobile device or a temporal location of the mobile device.

10. The method of claim 8, wherein the context of the mobile device includes a characterization of previous requests by the mobile device for information.

11. The method of claim 8, wherein the information originates from the one or more cloud services prior to storage on the first local coverage device.

12. The method of claim 8, wherein the first local coverage device is wirelessly connected to the mobile device and connected to the one or more cloud services via a network.

13. The method of claim 8, wherein the first local coverage device provides network access for a plurality of mobile devices with the local coverage area.

* * * * *